United States Patent Office 3,455,992
Patented July 15, 1969

3,455,992
PROCESS FOR PREPARING 11-DESOXYPROST-
AGLANDIN AND HOMOLOGS THEREOF
Jehan F. Bagli, Valois, Quebec, and Tibor Bogri, Montreal, Quebec, Canada, assignors to American Home Products Corporation, New York, N.Y., a corporation of Delaware
No Drawing. Filed May 10, 1966, Ser. No. 556,797
Int. Cl. C07c 61/36, 61/32, 69/74
U.S. Cl. 260—468       17 Claims The present invention relates to a novel process for the preparation of 9,15-dihydroxyprost-13-enoic acid, also called 11-desoxyprostaglandin, a compound possessing valuable pharmacological preparation and especially useful as hypotensive and anti-hypertensive agents. This invention also relates to homologs of 11-desoxyprostaglandin and to the intermediates used in the above novel process. 11-desoxyprostaglandin and its homologs may be represented by the following formula, in which $n$ is an integer of 1 to 6, and 11-desoxyprostaglandin is represented by the formula in which $n=4$.

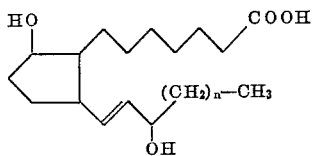

A method for preparing 11-desoxyprostaglandin has been disclosed in our co-pending U.S. patent application S. N. 485,935, filed Sept. 8, 1965. The present invention relates to a process which not only affords elaboration of the hydroxylated side-chain of 11-desoxyprostaglandin in a considerably simpler and more economical manner than by the process described in our earlier-filed application, but which also affords a simple method for the preparation of lower and higher homologs.

More specifically, we prefer to use as starting material the compound 2-(6-carbomethoxyhexyl)-cyclopentan-1-one-3-carboxylic acid chloride, the preparation of which is described in our earlier-filed U.S. patent application S. N. 485,935 cited above. In accordance with the method described therein, the latter compound is obtained by condensing the known compound ethyl 7-bromo-1-heptanoate with the equally known potassium salt of ethyl cyclopentanone carboxylate, by refluxing a mixture of the two compounds in an inert solvent, to obtain ethyl 2-(6-carbethoxyhexyl)-cyclopentan-1-one-2-carboxylate; treating the latter compound with elementary bromine in chloroform solution to obtain ethyl 2-(6-carbethoxyhexyl)-5-bromocyclopentan-1-one-2-carboxylate; treating the latter compound with a mineral acid, preferably 20% sulfuric acid, to obtain 2-(6-carboxyhexyl)-cyclopent-2-en-1-one- treating the latter compound with acetone cyanohydrin in the presence of an alkali metal carbonate and of a lower alkanol, preferably sodium carbonate and methanol, to obtain 2-(6-carboxyhexyl)-3-cyanocyclopentan-1-one; hydrolyzing the latter compound by treating it with an alkali metal hydroxide, preferably sodium hydroxide, to obtain 2-(6-carboxyhexyl)-3-carboxyl-cyclopentan-1-one; selectively esterifying the latter compound, preferably with methanol and p-toluenesulfonic acid, to obtain 2-(6-carbomethoxyhexyl)-cyclopentan-1-one-3-carboxylic acid; and converting the latter compound to its corresponding acid chloride, by treatment with an acid chloride such as, for example, oxalyl chloride, phosphorus pentachloride, or thionyl chloride to obtain the desired starting material for the novel process of this invention, 2-(6-carbomethoxyhexyl)-cyclopentan-1-one-3- carboxylic acid chloride.

In a preferred procedure for the preparation of 11-desoxyprostaglandin, and in accordance with the novel process of this invention, the last-named acid chloride (I) is condensed with a terminal alkyne containing from 4 to 9 carbon atoms, preferably 1-heptyne, under the conditions of the Friedel-Crafts reaction in the presence of a Lewis acid, preferably aluminum chloride, to yield the chlorovinyl ketone (II, $n=4$), 9,13-dioxo-15-chloroprost-14-enoic acid methyl ester. The latter compound, when treated with an alkali metal hydroxide or alkoxide in solution in a lower alkanol, preferably sodium hydroxide or sodium methoxide in methanolic solution, followed by addition of water to effect hydrolysis of the ester group, is converted to the corresponding enol ether (III, $n=4$), 9,13-dioxo-15-methoxyprost-14-enoic acid.

Alternatively, the chlorovinyl ketone (II, $n=4$) may be treated as described above without the subsequent addition of water, to yield the corresponding enol ether, 9,13-dioxo-15-methoxyprost-14-enoic acid methyl ester (VI, $n=4$), which is in turn hydrolyzed with an alkali metal hydroxide in solution in an aqueous lower alkanol, preferably sodium or potassium hydroxide in aqueous methanol, to yield the free acid of Formula III ($n=4$) described above.

9,13-dioxo-15-methoxyprost-14-enoic acid (III, $n=4$), obtained as above is then reduced with an alkali metal borohydride, preferably sodium borohydride, in solution in a lower alkanol containing more than one carbon atom, preferably isopropanol, to effect reduction of the ketone functions in positions 9 and 13, with subsequent hydrolysis of the enol ether group in position 15 by acidification during work-up and concomitant dehydration, to obtain the unsaturated ketone (IV, $n=4$), 9-hydroxy-15-oxoprost-13-enoic acid.

Alternatively, the above unsaturated ketone (IV, $n=4$) may also be obtained as follows: 9,13-dioxo-15-methoxyprost-14-enoic acid methyl ester (VI, $n=4$) is treated with an alkali metal borohydride in solution in a lower alkanol, preferably sodium borohydride in methanol, to yield 9-hydroxy 13-oxo-15-methoxyprost-14-enoic acid methyl ester (VIIa, $n=4$), which is hydrolyzed by treatment with an alkali metal hydroxide in solution in an aqueous lower alkanol, preferably sodium or potassium hydroxide in aqueous methanol, to yield the corresponding free acid (VIIb, $n=4$), 9 - hydroxy - 13-oxo-15-methoxyprost-14-enoic acid. The latter compound, upon treatment with an alkali metal borohydride, preferably sodium borohydride, in solution in a lower alkanol containing more than one carbon atom, preferably isopropanol, to effect reduction of the ketone function in position 13, with subsequent hydrolysis of the enol ether group in position 15 by acidification during work-up and concomatent dehydration, to yield the unsaturated ketone (IV, $n=4$), 9-hydroxy-15-oxoprost-13-enoic acid.

The last-named compound of Formula IV ($n=4$) when treated with an alkali metal borohydride in solution in a lower alkanol, preferably sodium borohydride in isopropanol, yields the desired dihydroxy acid of Formula V ($n=4$), 9,15-dihydroxy-prost-13-enoic acid.

The above sequence of reaction steps is obviously capable of being modified with a considerable degree of latitude, by replacing the preferred 1-heptyne in the first step with lower or higher homologs thereof. Thus, when using 1-butyne, 1-pentyne, 1-hexyne, 1-octyne, or 1-nonyne instead of 1-heptyne, the corresponding compounds of Formulae II–VII inclusive in which $n$ represents the integers 1, 2, 3, 5 and 6, respectively, are obtained.

The following formulae and examples will illustrate this invention.

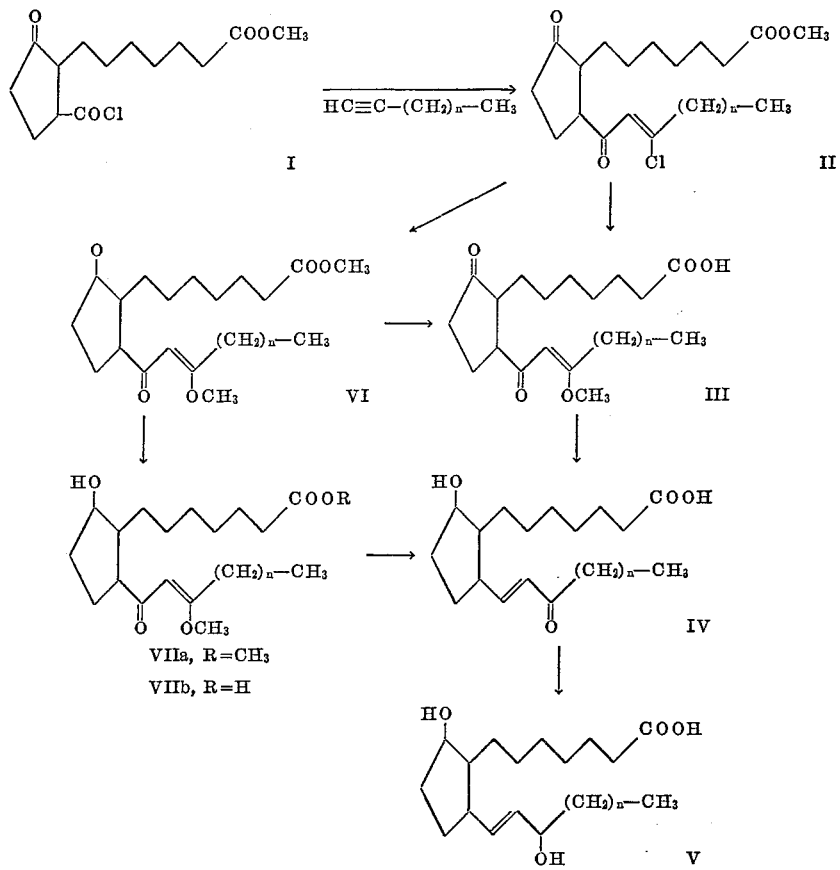

Example 1.—9,13-dioxo-15-chloroprost-14-enoic acid methyl ester (II, n=4)

To a stirred solution of 2-(6-carbomethoxyhexyl)-cyclopentan-1-one-3-carboxylic acid chloride (I, 2.3 g.) and 1-heptyne (1.18 g.) in dry carbon tetrachloride (50 ml.) aluminium chloride (4.63 g.) is added over a period of 2 hours in small portions. The reaction mixture is stirred overnight, ice is added and the aqueous phase is extracted with chloroform. The organic extract is washed with water, dried over magnesium sulphate and evaporated to dryness. The residue is chromatographed on silica gel and the title compound is eluted with hexane-ether (95:5). It is characterized by infrared absorption bands at 1730 cm.$^{-1}$ (cyclopentanone and carbomethoxy), 1680 cm.$^{-1}$ and 1595 cm.$^{-1}$ (chlorovinyl ketone), and by N.M.R. signals at $\delta$6.43 (vinyl proton), $\delta$3.54 (methoxyl of the ester), and $\delta$0.86 (terminal methyl group).

In the same manner, but using 1-butyne, 1-pentyne, 1-hexyne, 1-octyne, or 1-nonyne instead of 1-heptyne, the compounds 2-(6-carbomethoxyhexyl)-3-(1-oxo-3-chloropent-2-enyl)-cyclopentan-1-one (IIa),
2-(6-carbomethoxyhexyl)-3-(1-oxo-3-chlorohex-2-enyl)-cyclopentan-1-one (IIb),
2-(6-carbomethoxyhexyl)-3-(1-oxo-3-chlorohept-2-enyl)-cyclopentan-1-one (IIc),
2-(6-carbomethoxyhexyl)-3-(1-oxo-3-chloronon-2-enyl)-cyclopentan-1-one (IId),
2-(6-carbomethoxyhexyl)-3-(1-oxo-3-chlorodec-2-enyl)-cyclopentan-1-one (IIe), are respectively obtained.

Example 2.—9,13-dioxo-15-methoxyprost-14-enoic acid (III, n=4)

To a solution of 9,13-dioxo-15-chloroprost-14-enoic acid methyl ester obtained as described in Example 1 (II, n=4, 4.6 g.) in dry methanol (112 ml.) is added a solution of sodium hydroxide (15% in methanol, 7.66 ml.) and the mixture is stirred at room temperature for one half hour. Water (2–3 ml.) is added and the solvent is removed under reduced pressure over a period of twenty minutes on a steam bath. The residue is taken up in ether and shaken with water, the aqueous layer is acidified, extracted with ether, and washed with water. The ether layer is dried over magnesium sulfate, the solvent is removed, and the residue is chromatographed on silica gel (125 g.). Elution with 10 and 20% ether-benzene yields the title compound (III, n=4), characterized by infrared absorption bands at 1740 cm.$^{-1}$, (cyclopentanone), 1705 cm.$^{-1}$ (carboxylic acid), and 1675 cm.$^{-1}$ and 1575 cm.$^{-1}$ (enol ether of a $\beta$-diketone), as well as by an ultraviolet absorption band at 264 m$\mu$ ($\epsilon$ 10,000).

In the same manner, but using as starting materials the compounds IIa to IIe inclusive obtained in Example 1, the compounds 2-(6-carboxyhexyl)-3-(1-oxo-3-methoxypent-2-enyl)-cyclopentan-1-one (IIIa),
2-(6-carboxyhexyl)-3-(1-oxo-3-methoxyhex-2-enyl)-cyclopentan-1-one (IIIb),
2-(6-carboxyhexyl)-3-(1-oxo-3-methoxyhept-2-enyl)-cyclopentan-1-one (IIIc),
2-(6-carboxyhexyl)-3-(1-oxo-3-methoxynon-2-enyl)-cyclopentan-1-one (IIId),
2-(6-carboxyhexyl)-3-(1-oxo-3-methoxydec-2-enyl)-cyclopentan-1-one (IIIe)

are respectively obtained.

Example 3.—9,13-dioxo-15-methoxyprost-14-enoic acid methyl ester (VI, n=4)

9,13-dioxo-15-chloroprost-14-enoic acid methyl ester (II, n=4) obtained as described in Example 1 (360 mg.) is dissolved in dry methanol (30 ml.), 15% sodium hydroxide in methanol (0.6 ml.) is added and the mixture is allowed to stand at room temperature for one half hour. It is evaporated to approximately one half volume in vacuo at room temperature, diluted with ether (200 ml.) and washed with water. The ether layer is dried over magnesium sulphate, the solvent is evaporated and the residue is chromatographed on silica gel. The title compound is eluted with benzene-ethyl acetate (90:10) and is characterized by infrared absorption bands at 1730 cm.$^{-1}$ (cyclopentanone and carbomethoxy), 1670 cm.$^{-1}$ and 1575 cm.$^{-1}$ (enol-ether of β-diketone), as well as by N.M.R. signals at δ5.35 (vinyl proton), δ3.53 (methoxyl of the ester), δ3.62 (vinyl methoxy), and δ0.85 (terminal methyl).

In the same manner, but using as starting materials the compounds IIa to IIe inclusive obtained in Example 1, the compounds 2-(6-carbomethoxyhexyl)-3-(1-oxo-3-methoxypent-2-enyl)-cyclopentan-1-one (VIa),
2-(6-carbomethoxyhexyl)-3-(1-oxo-3-methoxyhex-2-enyl)-cyclopentan-1-one (VIb),
2-(6-carbomethoxyhexyl)-3-(1-oxo-3-methoxyhept-2-enyl)-cyclopentan-1-one (VIc),
2-(6-carbomethoxyhexyl)-3-(1-oxo-3-methoxynon-2-enyl)-cyclopentan-1-one (VId),
2-(6-carbomethoxyhexyl)-3-(1-oxo-3-methoxydec-2-enyl)-cyclopentan-1-one (VIe), are respectively obtained.

Example 4.—9,13-dioxo-15-methoxyprost-14-enoic acid (III, n=4)

To a solution of 9,13-dioxo-15-methoxyprost-14-enoic acid methyl ester (VI, 1.88 g.), obtained as described in Example 2 in methanol (82 ml.), a solution of potassium hydroxide (0.945 g.) in water (8.19 ml.) is added. The mixture is refluxed for forty-five minutes, cooled and diluted with ether; the aqueous layer is acidified, extracted with ether, washed with water, dried and the solvent removed. The residue is chromatographed on silica gel (53 g.) in benzene. Elution with ether-benzene 10:90 and 20:80 yields the title compound identical with the compound III (n=4) obtained in Example 2.

In the same manner, by using as starting materials the compounds VIa to VIe inclusive obtained in Example 3, the compounds IIIa to IIIe inclusive described in Example 2, are respectively obtained.

Example 5.—9-hydroxy-15-oxoprost-13-enoic acid (IV, n=4)

To a solution of 9,13-dioxo-15-methoxyprost-14-enoic acid (III, n=4, 0.527 g.), obtained in Example 2 or 4 in isopropyl alcohol (41.0 ml.) sodium borohydride (0.492 g.) is added and the mixture is refluxed for 2 hours. It is cooled, diluted with ether, washed first with water containing acetic acid (0.5 ml.), then with water, dried, and the solvent evaporated. The resulting residue is chromatographed on silica gel (15 g.) in benzene. Elution with 20% and 30% ether-benzene yields the title compound (IV, n=4) homogenous by thin layer chromatography, and characterized by infrered absorption bands at 1703 cm.$^{-1}$ (acid carbonyl), 1668 cm.$^{-1}$ (unsaturated ketone) and 1620 cm.$^{-1}$ (double bond), as well as by ultraviolet absorption at 232 mμ (δ9,400) and N.M.R. signals at δ3.95 (carbinolic proton), δ6.0 and δ6.5 (vinyl protons), and δ0.87 (terminal methyl group).

In the same manner, but using as starting materials the compounds IIIa to IIIe inclusive obtained in Example 2 or 4, the compounds 2-(6-carboxyhexyl)-3-(3-oxopent-1-enyl)-cyclopentan-1-ol (IVa),
2-(6-carboxyhexyl)-3-(3-oxohex-1-enyl)-cyclopentan-1-ol (IVb),
2-(6-carboxyhexyl)-3-(3-oxohept-1-enyl)-cyclopentan-1-ol (IVc),
2-(6-carboxyhexyl)-3-(3-oxonon-1-enyl)-cyclopentan-1-ol (IVd),
2-(6-carboxyhexyl)-3-(3-oxodec-1-enyl)-cyclopentan-1-ol (IVe), are respectively obtained.

Example 6.—9-hydroxy-13-oxo-15-methoxyprost-14-enoic acid methyl ester (VIIa, =4)

9,13-dixo-15-methoxyprost-14-enoic acid methyl ester (VI, n=4, 108 mg.) obtained in Example 3, is dissolved in methanol (5 ml.) and sodium borohydride (10.6 mg.) is added in small portions over a period of 45 minutes. The mixture is evaporated to dryness, water (2 ml.) is added and the mixture is extracted with ether. The ether layer is washed with water, dried over magnesium sulphate and the solvent is removed. Chromatography of the residue on silica gel with benezene-ethyl acetate 85:15) yields the title compound (VIIa, n=4), characterized by infrared absorption bands at 3380 cm.$^1$ (bonded hydroxyl), 1725 cm.$^{-1}$ (ester carbonyl), 1660 cm.$^{-1}$ and 1568 cm.$^{-1}$ (enol-ether of β-diketone), and by N.M.R. signals at δ5.32 (vinyl proton), δ3.51 (methoxy of the ester), δ3.57 (vinyl methoxy) and δ0.81 (terminal methyl group).

In the same manner, but using the compounds VIa to VIe inclusive obtained in Example 3 as starting materials, the compounds 2-(6-carbomethoxyhexyl)-3-(1-oxo-3-methoxypent-2-enyl)-cyclopentan-1-ol (VIIc),
2-(6-carbomethoxyhexyl)-3-(1-oxo-3-methoxyhex-2-enyl)-cyclopentan-1-ol (VIId),
2-(6-carbomethoxyhexyl)-3-(1-oxo-3-methoxyhept-2-enyl)-cyclepentan-1-ol (VIIe),
2-(6-carbomethoxyhexyl)-3-(1-oxo-3-methoxynon-2-enyl)-cyclopentan-1-ol (VIIf),
2-(6-carbomethoxyhexyl)-3-(1-oxo-3-methoxydec-2-enyl)-cyclopentan-1-ol (VIIg), are respectively obtained.

Example 7.—9-hydroxy-13-oxo-15-methoxyprost-14-enoic acid (VIIb, n=4)

To a solution of 9-hydroxy-13-oxo-15-methoxyprost-14-enoic acid methyl ester (VIIa, n=4, 1.88 g.) in methanol (82 ml.) a solution of potassium hydroxide (0.945 g.) in water (8.2 ml.) is added and the mixture is refluxed for 45 minutes. Methanol is removed under reduced pressure, the aqeous solution is mixed with ether, acidified with ice cold 3% hydrochloric acid, and extracted with ether. The ether extracts are washed with water, dried and evaporated, to yield the title compound VIIb (n=4), characterized by infrared absorption bands at 3500 cm.$^{-1}$ (hydroxyl), 1705 cm.$^{-1}$, acid carbonyl), 1665 cm.$^{-1}$ and 1570 cm.$^{-1}$ (enol-ether of β-diketone).

In the same manner, but using as starting materials the compounds VIIc to VIIg, inclusive obtained in Example 6, the compounds.

2-(6-carbonxyhexyl)-3-(1-oxo-3-bethoxypent-2-enyl)-cyclopentan-1-ol (VIIh),
2-(6-carboxyhexyl)-3-(1-oxo-3-methoxyhex-2-enyl)-cyclopentan-1-ol (VIIi),
2-(6-carboxyhexyl)-3-(1-oxo-3-methoxyhept-2-enyl)-cyclopentan-1-ol (VIIj), 2-(6-carboxyhexyl)-3-(1-oxo-3-methoxynon-2-enyl)-
   cyclopentan-1-ol (VII*k*),
2-(6-carboxyhexyl)-3-(1-oxo-3-methoxydec-2-enyl)-
   cyclopentan-1-ol (VII*l*),
are respectively obtained.

Example 8.—9-hydroxy-15-oxoprost-13-enoic
acid (IV, *n*=4)

To a solution of 9-hydroxy-13-oxo-15-methoxyprost-14-enoic acid (VII *b*, *n*=4, 0.67 g.) obtained as in Example 7 in isopropanol sodium borohydride (0.044 g.) is added and the mixture is refluxed for 1–5 hours. Most of the solvent is removed under reduced pressure and the mixture is diluted with ether, washed with water, dried ,and evaporated. The residue is chromatographed on silica gel to yield the title compound (IV, *n*=4), identical with the compound obtained in Example 5 according to infrared, ultraviolet, and N.M.R. data.

In the same manner but using as starting materials the compounds VII*h* to VII*l* inclusive obtained in Example 7, the compounds IV*a* to IV*e* inclusive described in Example 5 are respectively obtained.

Example 9.—9,15-dihydroxyprost-13-enoic acid
(V, *n*=4)

To a solution of 9-hydroxy-15-oxoprost-13-enoic acid (IV, *n*=4, 0.044 g.), obtained in Examples 5 or 8, in isopropyl alcohol (2.5 ml.), sodium borohydride (0.019 g.) is added and the mixture is stirred at room temperature for one-half hour. It is diluted with ether, washed with water three times, and the aqueous layer is acidified with 3% hydrochloric acid and extracted with ether. The ether extract is dried and the solvent is removed to yield the title compound (V, *n*=4) identical in every respect with the same compound prepared by the method described in our co-pending U.S. patent application S.N. 485,935 cited above.

In the same manner, by using as starting materials the compounds IV*a* to IV*e* inclusive obtained in Example 5, the compounds 2-(6-carboxyhexyl)-3-(3-hydroxypent-1-enyl) - cyclopen-
   tan-1-ol (V*a*),
2-(6-carboxyhexyl)-3-(3-hydroxyhex-1-enyl)-
   cyclopentan-1-ol (V*b*),
2-(6-carboxyhexyl)-3-(3-hydroxyhept-1-enyl)-
   cyclopentan-1-ol (V*c*),
2-(6-carboxyhexyl)-3-(3-hydroxynon-1-enyl)-
   cyclopentan-1-ol (V*d*),
2-(6-carboxyhexyl)-3-(3-hydroxydec-1-enyl)-
   cyclopentan-1-ol (V*e*), are respectively obtained.

We claim:
1. The process of preparing a product cosisting of a compound of the formula

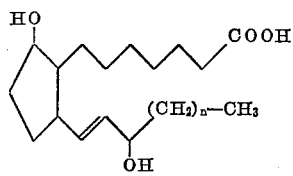

wherein *n* is an integer of from 1 to 6 which comprises condensing a compound of the formula

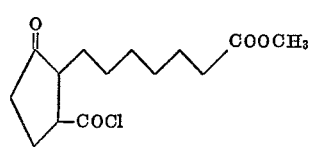

with a terminal alkyne containing from 4 to 9 carbon atoms under the conditions of the Friedel-Crafts reaction in the presence of a Lewis acid, thereby securing a chlorovinyl ketone of formula

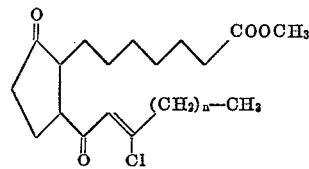

treating said last-named compound with an alkaline agent selected from the group consisting of alkali metal hydroxides and alkoxides in solution of a lower alkanol, followed by addition of water, thereby securing an enol ether of the formula

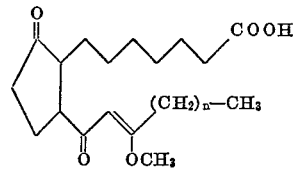

reducing said last-named compound by treatment thereof with an alkali metal borohydride in solution in a lower alkanol containing more than one carbon atom to effect reduction of the ketone functions in position-9 and -13, followed by acidification to effect hydrolysis of the enol ether group in position-15 and concomitant dehydration, thereby obtaining an unsaturated ketone of formula

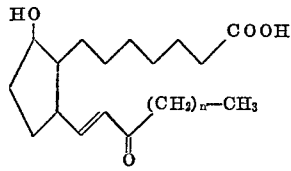

and treating said last-named compound with an alkali metal borohydride in solution in a lower alkanol, thereby securing said desired product; *n* in all cases representing an integer of from 1 to 6.

2. The process of preparing a product consisting of a compound of the formula

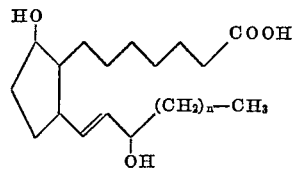

wherein *n* is an integer of from 1 to 6, which comprises condensing a compound of the formula

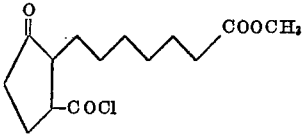

with a terminal alkyne containing from 4 to 9 carbon atoms under the conditions of the Friedel-Crafts reaction in the presence of a Lewis acid, thereby obtaining a chlorovinyl ketone of the formula

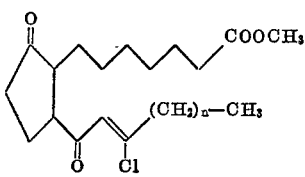

treating said last named compound with an alkaline agent selected from the group consisting of alkali metal hydroxides and alkali metal alkoxides in solution in a lower alkanol, thereby securing an enol ether of the formula

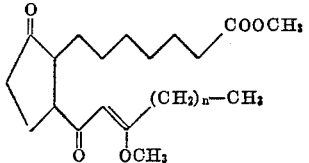

hydrolyzing said last-named compound by treatment thereof with an alkali metal hydroxide in solution in an aqueous lower alkanol, thereby securing the free acid of formula

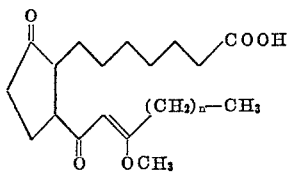

reducing said last-named compound by treatment thereof with an alkali metal borohydride in solution in a lower alkanol containing more than one carbon atom to effect reduction of the ketone functions in positions-9 and -13, followed by acidification to effect hydrolysis of the enol ether group in position-15 and concomitant dehydration, thereby obtaining an unsaturated ketone of formula

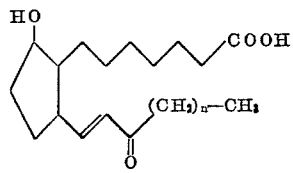

and treating said last-named compound with an alkali metal borohydride in solution in a lower alkanol, thereby securing said desired product, $n$ in all cases representing an integer of from 1 to 6.

3. The process of preparing a product consisting of a compound of the formula

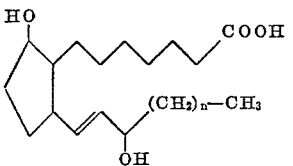

wherein $n$ is an integer of from 1 to 6, which comprises condensing a compound of the formula

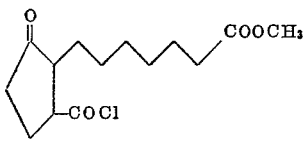

with a terminal alkyne containing from 4 to 9 carbon atoms under the conditions of the Friedel-Crafts reaction in the presence of a Lewis acid, thereby obtaining a chlorovinyl ketone of formula

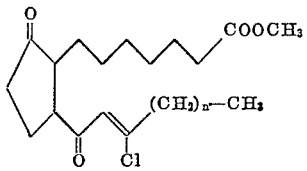

treating said last-named compound with an alkaline agent selected from the group consisting of alkali metal hydroxides and alkali metal alkoxides in solution in a lower alkanol, thereby securing an enol ether of the formula

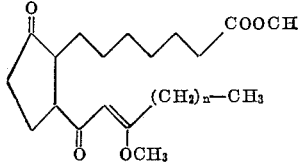

treating said last-named compound with an alkali metal borohydride in solution in a lower alkanol, thereby securing a compound of the formula

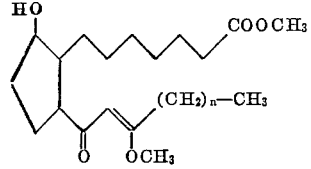

treating said last-named compound with an alkali metal hydroxide in solution in an aqueous lower alkanol to effect hydrolysis thereof, thereby securing the corresponding free acid of formula

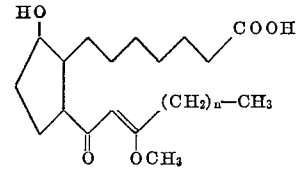

treating said last-named compound with an alkali metal borohydride in solution in a lower alkanol containing more than one carbon atom, to effect reduction of the ketone function in position 13, followed by acidification to effect hydrolysis of the enol ether group in position 15 and concomitant dehydration, thereby obtaining an unsaturated ketone of formula

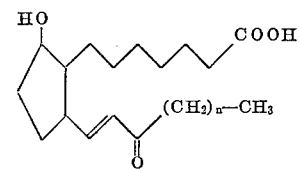

and treating said last-named compound with an alkali metal borohydride in solution in a lower alkanol, thereby securing said desired product; $n$ in all cases representing an integer of from 1 to 6.

4. The process of preparing 9,15-dihydroxyprost-13-enoic acid which comprises condensing 2-(6-carbomethoxyhexyl)-cyclopentan-1-one-3-carboxylic acid chloride with 1-heptyne under the condition of the Friedel-Crafts reaction in the presence of a Lewis acid, thereby securing 9,13-dioxo-15-chloroprost-14-enoic acid methyl ester; treating said last-named compound with an alkaline agent selected from the group consisting of alkali metal hydroxides and alkoxides in solution in a lower alkanol, followed by addition of water, thereby securing 9,13-dioxo-15-methoxyprost-14-enoic acid; reducing said last-named compound by treatment thereof with an alkali metal borohydride in solution in a lower alkanol containing more than one carbon atom to effect reduction of the ketone functions in positions-9 and -13, followed by acidification to effect hydrolysis of the enol ether group in position-15 and concomitant dehydration, thereby obtaining 9-hydroxy-15-oxoprost-13-enoic acid; and treating said last-named compound with an alkali metal borohydride in solution in a lower alkanol, thereby securing 9,15-dihydroxyprost-13-enoic acid.

5. The process of preparing 9,15-dihydroxyprost-13-enoic acid which comprises condensing 2-(6-carbomethoxyhexyl)-cyclopentan-1-one-3-carboxylic acid chloride with 1-heptyne under the conditions of the Friedel-Crafts reaction in the presence of a Lewis acid, thereby obtaining 9,13-dioxo-15-chloroprost-14-enoic acid methyl ester; treating said last-named compound with an alkaline agent selected from the group consisting of alkali metal hydroxides and alkali metal alkoxides in solution in a lower alkanol, thereby obtaining 9,13-dioxo-15-methoxyprost-14-enoic acid methyl ester; hydrolyzing said last-named compound by treatment thereof with an alkali metal hydroxide in solution in an aqueous lower alkanol, thereby securing 9,13-dioxo-15-methoxyprost-14-enoic acid; reducing said last-named compound by treatment thereof with an alkali metal borohydride in solution in a lower alkanol containing more than one carbon atom to effect reduction of the ketone functions in positions-9 and -13, followed by acidification to effect hydrolysis of the enol ether group in position-15 and concomitant dehydration, thereby securing 9-hydroxy-15-oxoprost-13-enoic acid; and treating said last-named compound with an alkali metal borohydride in solution in a lower alkanol, thereby securing 9,15-dihydroxyprost-13-enoic acid.

6. The process of preparing 9,15-dihydroxyprost-13-enoic acid which comprises condensing 2-(6-carbomethoxyhexyl)-cyclopentan-1-one-3-carboxylic acid chloride with 1-heptyne under the conditions of the Friedel-Crafts reaction in the presence of a Lewis acid, thereby obtaining 9,13-dioxo-15-chloroprost-14-enoic acid methyl ester; treating said last-named compound with an alkaline agent selected from the group consisting of alkali metal hydroxides and alkali metal alkoxides in solution in a lower alkanol, thereby securing 9,13-dioxo-15-methoxyprost-14-enoic acid methyl ester; treating said last-named compound with an alkali metal borohydride in solution in a lower alkanol, thereby securing 9-hydroxy-13-oxo-15-methoxyprost-14-enoic acid methyl ester; treating said last-named compound with an alkali metal hydroxide in solution in an aqueous lower alkanol to effect hydrolysis thereof, thereby securing 9-hydroxy-13-oxo-15-methoxyprost-14-enoic acid; treating said last named-compound with an alkali metal borohydride in solution in a lower alkanol containing more than one carbon atom, to effect reduction of the ketone function in position-13 followed by acidification to effect hydrolysis of the enol ether group in position 15 with concomitant dehydration, thereby obtaining 9-hydroxy-15-oxoprost-13-enoic acid; and treating said last-named compound with an alkali metal borohydride in solution in a lower alkanol, thereby securing 9,15-dihydroxyprost-13-enoic acid.

7. 9,13-dioxo-15-chloroprost-14-enoic acid methyl ester.

8. 9,13-dioxo-15-methoxyprost-14-enoic acid.

9. 9-hydroxy-15-oxoprost-13-enoic acid.

10. 9,13-dioxo-15-methoxyprost-14-enoic acid methyl ester.

11. 9-hydroxy-13-oxo-15-methoxyprost-14-enoic acid methyl ester.

12. 9-hydroxy-13-oxo-15-methoxyprost-14-enoic acid.

13. 2-(6-carboxyhexyl) - 3 - (3-hydroxypent-1-enyl)-cyclopentan-1-ol.

14. 2-(6-carboxyhexyl) - 3 - (3-hydroxyhex-1-enyl)-cyclopentan-1-ol.

15. 2-(6-carboxyhexyl) - 3 - (3-hydroxyhept-1-enyl)-cyclopentan-1-ol.

16. 2-(6-carboxyhexyl) - 3 - (3-hydroxynon-1-enyl)-cyclopentan-1-ol.

17. 2-(6-carboxyhexyl) - 3 - (3-hydroxydec-1-enyl)-cyclopentan-1-ol.

References Cited

B. Samuelson: Angewandte Chemie, International ed., vol. 4, May 1965.

LORRAINE A. WEINBERGER, Primary Examiner

P. J. KILLOS, Assistant Examiner

U.S. Cl. X.R.

260—514, 999